United States Patent
Liao et al.

(10) Patent No.: US 8,422,205 B2
(45) Date of Patent: *Apr. 16, 2013

(54) HOUSING FOR ELECTRONIC DEVICES AND METHOD FOR MAKING THE SAME

(75) Inventors: Kai-Rong Liao, Shenzhen (CN); Peng-Cheng Tong, Shenzhen (CN); Po-Feng Ho, Shindian (TW); Shih-Wei Yang, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 346 days.

This patent is subject to a terminal disclaimer.

(21) Appl. No.: 12/911,831

(22) Filed: Oct. 26, 2010

(65) Prior Publication Data

US 2011/0235246 A1    Sep. 29, 2011

(30) Foreign Application Priority Data

Mar. 23, 2010   (CN) .......................... 2010 1 0130416

(51) Int. Cl.
*G06F 1/16* (2006.01)

(52) U.S. Cl.
USPC ..................................... 361/679.01

(58) Field of Classification Search .............. 361/679.01
See application file for complete search history.

(56) References Cited

U.S. PATENT DOCUMENTS

| 7,612,997 | B1 * | 11/2009 | Diebel et al. | 361/679.56 |
| 7,894,185 | B2 * | 2/2011 | Weber et al. | 361/679.56 |
| 2006/0104021 | A1 * | 5/2006 | Chen et al. | 361/683 |
| 2008/0112122 | A1 * | 5/2008 | Chang | 361/683 |
| 2010/0053859 | A1 * | 3/2010 | Chang | 361/679.01 |
| 2010/0124040 | A1 * | 5/2010 | Diebel et al. | 361/816 |
| 2012/0039023 | A1 * | 2/2012 | Renwick | 361/679.01 |

* cited by examiner

*Primary Examiner* — Lisa Lea Edmonds
(74) *Attorney, Agent, or Firm* — Altis Law Group, Inc.

(57) ABSTRACT

An electronic device includes a housing and an electronic module. The housing includes a transparent main body, a masking layer partially adhered to the transparent main body, and a cover. A bare area is exposed forming the masking layer to define a transparent window. The housing defines a receiving chamber and an open end communicating with the receiving chamber. The electronic module includes a touch display screen. The electronic module is received in the receiving chamber, the touch display screen aligns to the transparent window, and the cover seals the open end. The present disclosure further discloses a housing for the electronic device and a method for making the housing.

13 Claims, 5 Drawing Sheets

HOUSING FOR ELECTRONIC DEVICES AND METHOD FOR MAKING THE SAME

CROSS-REFERENCE TO RELATED APPLICATIONS

This application is one of the four related co-pending U.S. patent applications listed below. All listed applications have the same assignee and were concurrently filed herewith. The disclosure of each of the listed applications is incorporated by reference into all the other listed applications.

| Attorney Docket No. | Title | Inventors |
| --- | --- | --- |
| 12/911831 | HOUSING FOR ELECTRONIC DEVICESAND METHOD FOR MAKING THE SAME | Liao et al. |
| 12/911838 | HOUSING OF ELECTRONIC DEVICE AND METHOD FOR MAKING THE SAME | Liao et al. |
| 12/911839 | HOUSING OF ELECTRONIC DEVICE AND METHOD FOR MAKING THE SAME | Liao et al. |
| 12911843 | HOUSING AND ELECTRONIC DEVICE USING THE SAME | Liao et al. |

BACKGROUND

1. Technical Field

The present disclosure relates to housings for electronic devices and method for making the housings.

2. Description of Related Art

Typically, an electronic device housing includes a number of portions. The portions can be assembled together with latching members. However, the structures of these housings are complicated due to the latching members, and gaps usually exist at the junctions of the portions. Therefore, dust or other contaminants may easily enter into the housing through these gaps.

Therefore, there is room for improvement within the art.

BRIEF DESCRIPTION OF THE FIGURES

Many aspects of the housing for electronic devices and method for making the housing can be better understood with reference to the following figures. The components in the figures are not necessarily drawn to scale, the emphasis instead being placed upon clearly illustrating the principles of the housing for electronic devices and method for making the housing. Moreover, in the drawings like reference numerals designate corresponding parts throughout the several views.

DETAILED DESCRIPTION

Figure 1:
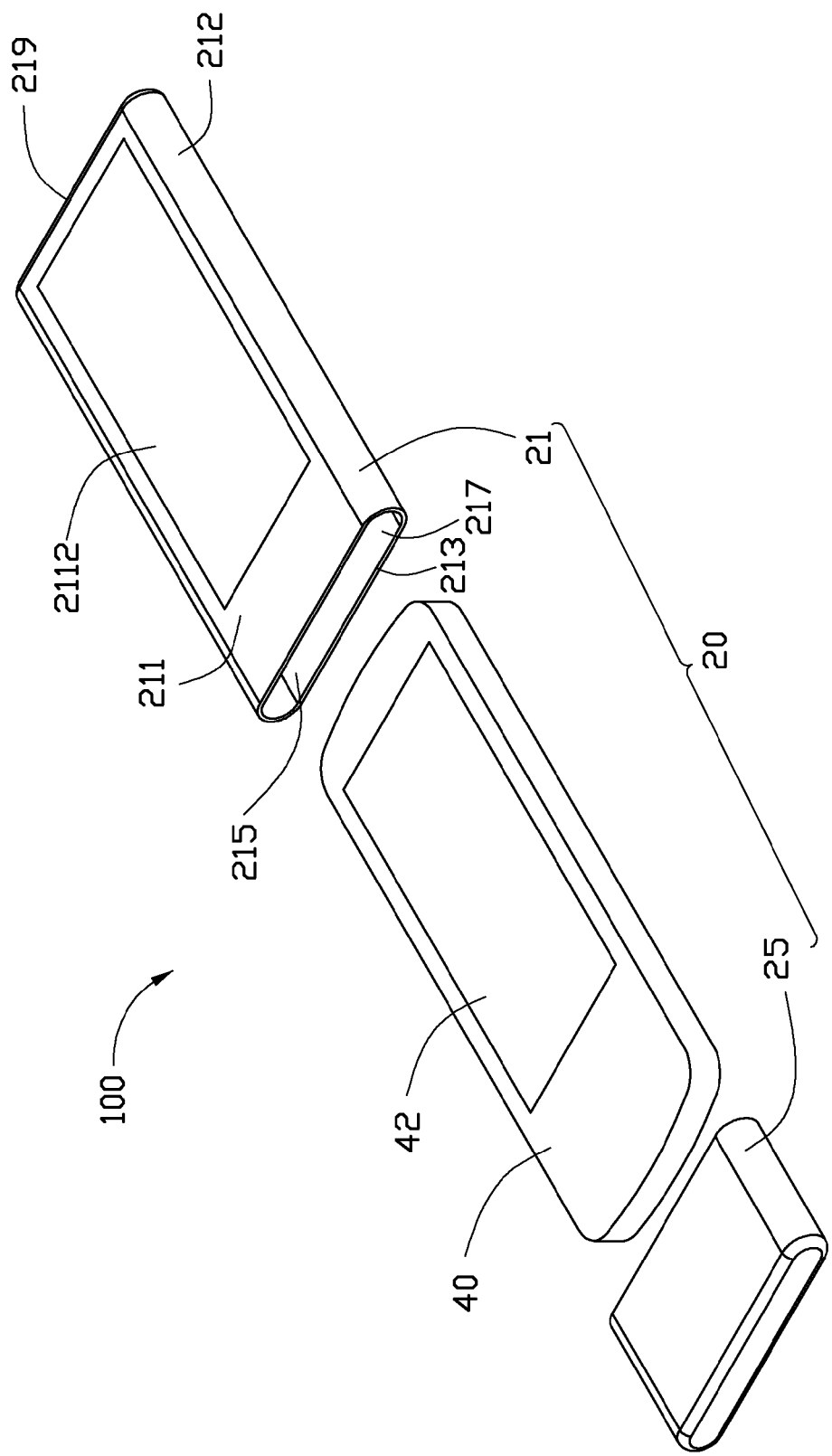
FIG. 1 is an exploded view of an exemplary embodiment of a housing.
Figure 2:
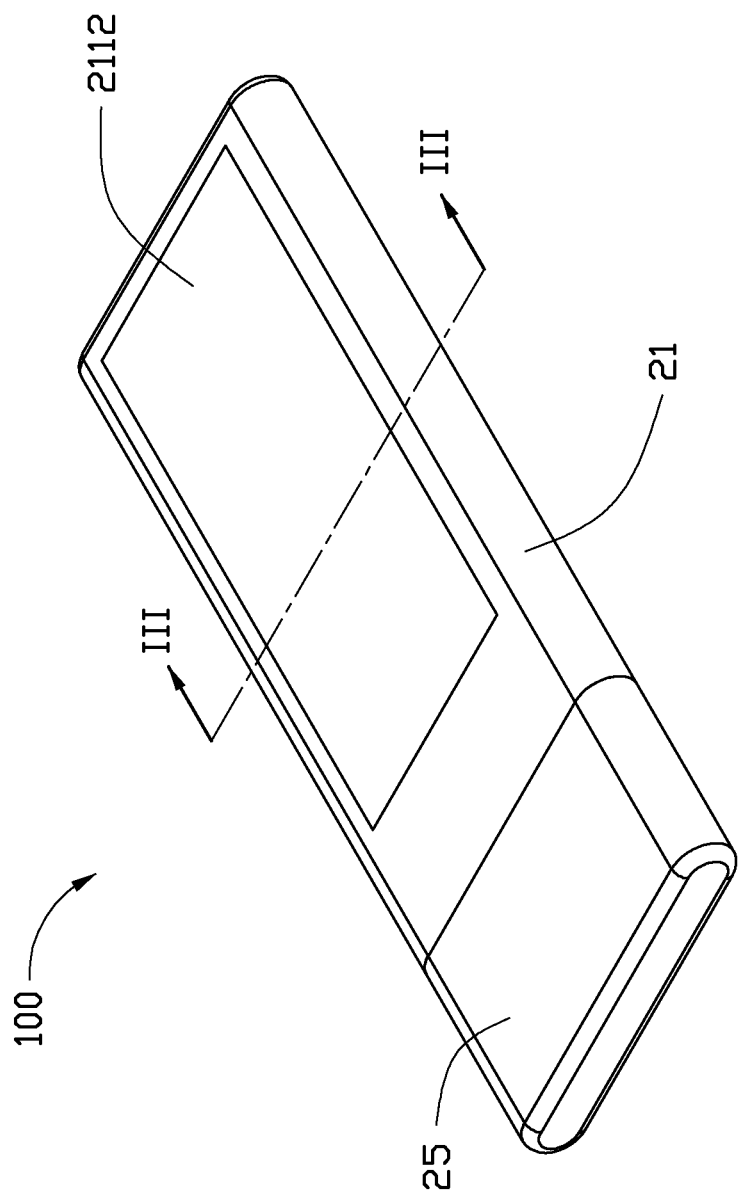
FIG. 2 is an assembled view of the housing in FIG. 1.
Figure 3:
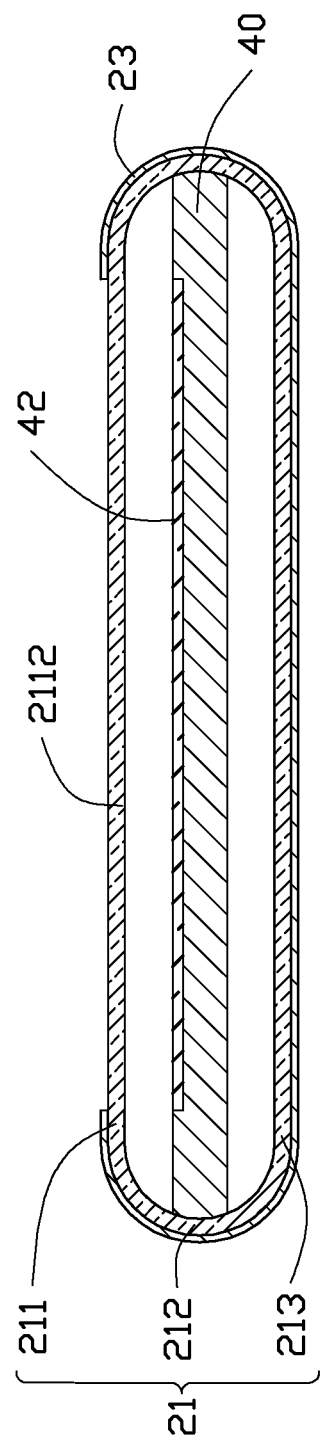
FIG. 3 is a cross-sectional view of the housing in FIG. 2 taken along line III-III.

FIG. 1 to FIG. 3 show an exemplary electronic device 100, such as a mobile phone, or a personal digital assistant. The electronic device 100 includes a housing 20 and an electronic module 40 (schematically shown) received in the housing 20.

The housing 20 includes a main body 21, a masking layer 23, and a cover 25. The main body 21 may be a hollow sleeve, and includes a first sidewall 211, a second sidewall 213 opposite to the first sidewall 211, two connecting walls 212 connecting the first sidewall 211 to the second sidewall 213, and a top wall 219. The first sidewall 211, the connecting walls 212, the second sidewall 213, and the top wall 219 are integrally formed with each other and cooperatively define a receiving chamber 215. The housing 20 defines an open end 217 opening the receiving chamber 215. The receiving chamber 215 receives the electronic module 40. The main body 21 may be made of a transparent moldable plastic. The transparent moldable plastic may be one or more thermoplastic materials selected from a group consisting of polycarbonate (PC), acrylonitrile-butadiene-styrene (ABS), polymethyl methacrylate (PMMA), butylene terephthalate (PBT), and phenylene sulfide (PPS).

The masking layer 23 may be made of opaque ink partially coated on the main body 21 for hiding internal electronic components of the electronic device 100 except the electronic module 40. Therefore, a bare area is exposed from the masking layer 23 to define a transparent window 2112. The masking layer 23 may be made of opaque ink, paint, or metal coating. An exemplary embodiment of the masking layer 23 is coated on the second sidewall 213, the connecting walls 212, the top wall 219, and is partially coated on the first sidewall 211 of the main body 21, and the transparent window 2112 is defined on the first sidewall 211. The cover 25 may be made of metal or opaque plastic for sealing to the open end 217, such as by adhesive. The electronic module 40 includes a touch display screen 42 for displaying information and operating. When the electronic module 40 is received in the housing 20, the touch display screen 42 is exposed by the transparent window 2112.

Figure 4:
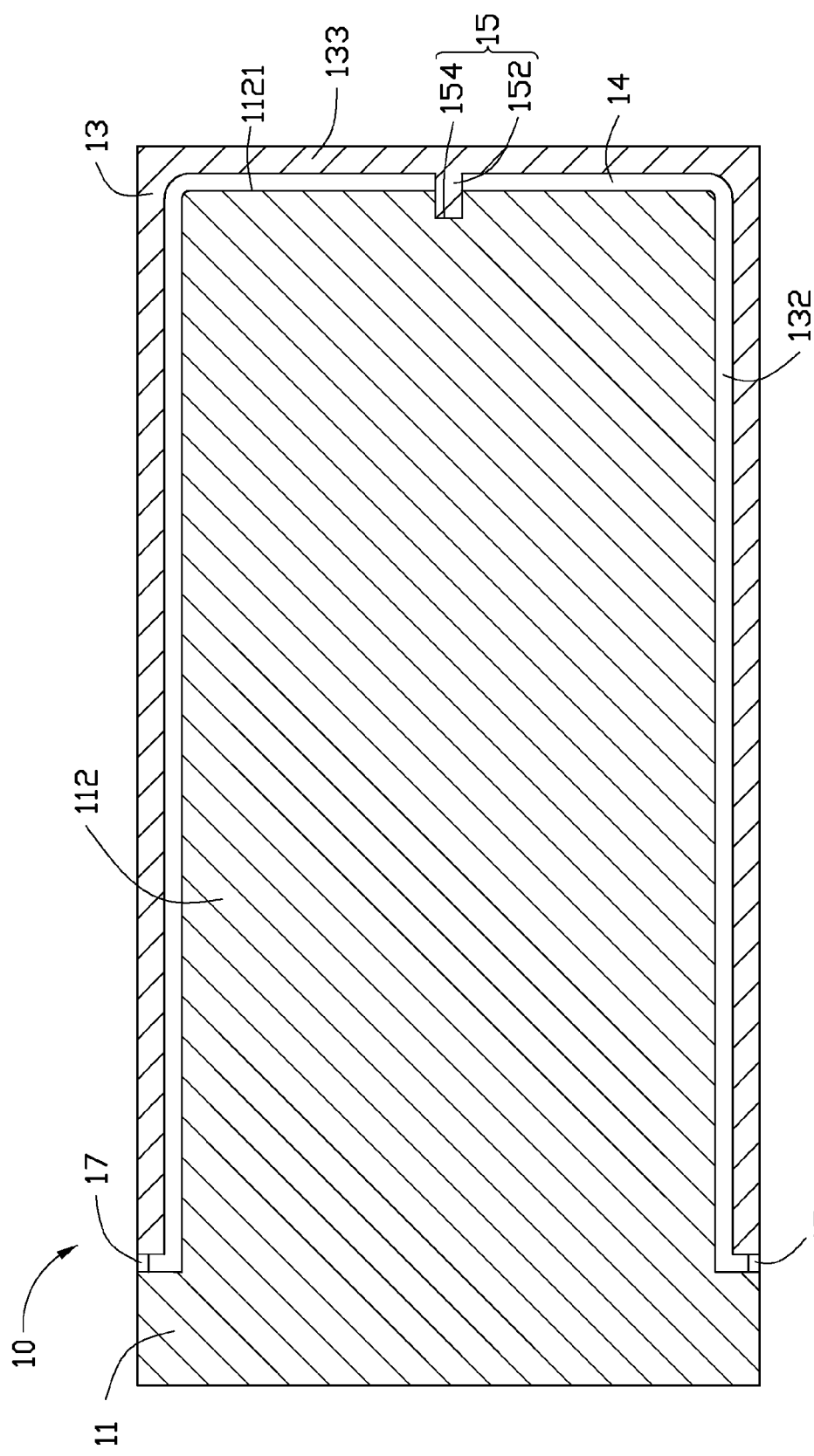
FIG. 4 is a cross-sectional view of an injection mold for manufacturing the housing shown in FIG. 3.

An exemplary embodiment of a method for making the electronic device 100 may include the following steps:

Referring to FIG. 4, an injection mold 10 is provided. The injection mold 10 includes a core 11, a cavity 13 matching with the core 11, and a positioning mechanism 15. The core 11 includes a protrusion 112 protruding therefrom. The protrusion 112 has a top portion 1121 facing the cavity 13.

The cavity 13 defines a recess 132 and a bottom 133 facing the protrusion 112. When the injection mold 10 is closed, the protrusion 112 is received in the recess 132 to define a mold chamber 14. The positioning mechanism 15 includes a positioning post 152 and a hole 154 receiving the positioning post 152. The positioning post 152 is mounted on a bottom 133 of the cavity 13 opposing the top portion 1121. The hole 154 is defined in the top portion 1121. The injection mold 10 includes at least two gates 17 defined between the core 11 and the cavity 13 when the injection mold 10 is closed. When the injection mold 10 is closed, the positioning post 152 is inserted into the hole 154 to prevent the core 112 from deviating from the cavity 13.

Figure 5:
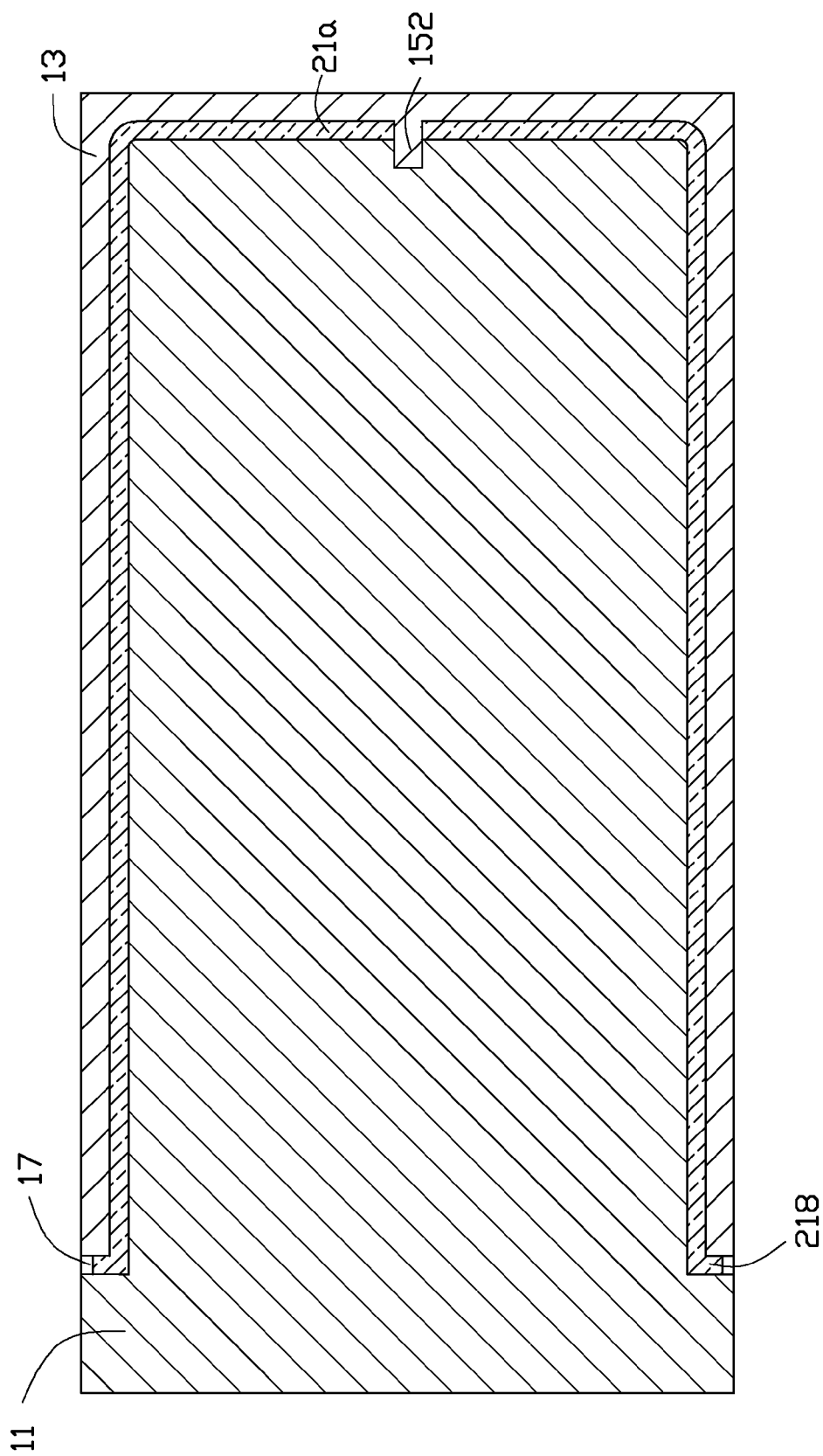
FIG. 5 is a cross-sectional view of a moldable plastic injected into the injection mold shown in FIG. 4.

Referring to FIG. 5, the transparent moldable plastic is injected into the mold chamber 14 from the gates 17 to form a pre-finished main body 21a. The pre-finished main body 21a defines the open end 217 (shown in FIG. 1), with an edge 218 formed at a peripheral of the open end 217. An ejector mechanism set around the protrusion 112 can eject the edge 218, to detach the pre-finished main body 21a from the injection mold 10. The transparent moldable plastic may be one or more thermoplastic materials selected from a group consisting of polycarbonate (PC), acrylonitrile-butadiene-styrene (ABS), polymethyl methacrylate (PMMA), butylene terephthalate (PBT), and phenylene sulfide (PPS).

After the injection mold 10 has cooled, the pre-finished main body 21*a* is detached from the injection mold 10. Then, the edge 218 is trimmed to form the main body 21.

The masking layer 23 partially covers the main body 21, correspondingly, the transparent window 2112 is exposed from the masking layer 23. The masking layer 23 is coated on the second sidewall 213, the connecting walls 212, the top wall 219, and is partially coated on the first sidewall 211.

The electronic module 40 is inserted into the receiving chamber 215 from the open end 217. The electronic module 40 includes the touch display screen 42 disposed in the transparent window 2112. The cover 25 seals the open end 217 such as by the adhesive.

The housing 20 defines one open end 217 sealed by the cover 25. Therefore, the structure of the housing 20 is simple, and the contamination may not easily enter into the housing 20 from the open end 217.

In another exemplary embodiment, the hole 154 can be defined in the female cavity 13. Correspondingly, the positioning post 152 is mounted on the top portion 1121.

In another exemplary embodiment, the masking layer 23 is partially adhered to an inner wall of the main body 21 and the transparent window 2112 is exposed from the first sidewall 211.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device, comprising:
    a housing comprising a transparent main body, a masking layer partially attached to the transparent main body, the housing defining a receiving chamber and an open end communicating with the receiving chamber;
    an electronic module received in the receiving chamber; and
    a cover sealing the open end.

2. The electronic device as claimed in claim 1, wherein the housing comprises a first sidewall, a second sidewall opposite to the first sidewall, two connecting walls connecting the first sidewall to the second sidewall, and a top wall; the first sidewall, the second sidewall, the connecting walls, and the top wall cooperatively define the receiving chamber and the open end.

3. The electronic device as claimed in claim 2, wherein the masking layer is coated on the second sidewall, the connecting walls, the top wall, and is partially coated on the first sidewall of the main body, and a transparent window is defined on the first sidewall.

4. The electronic device as claimed in claim 3, wherein the masking layer is partially adhered to an inner wall of the transparent main body and the transparent window is exposed from the first sidewall.

5. The electronic device as claimed in claim 1, wherein the masking layer is made of opaque ink, paint, or metal coating.

6. A housing, comprising:
    a transparent main body defining a receiving chamber and an open end communicating with the receiving chamber;
    a masking layer partially attached to the transparent main body to form a covered area and a non-covered area; and
    a cover sealing the open end.

7. The housing as claimed in claim 6, wherein the housing comprises a first sidewall, a second sidewall opposite to the first sidewall, two connecting walls connecting the first sidewall to the second sidewall, and a top wall; the first sidewall, the second sidewall, the connecting walls, and the top wall cooperatively define the receiving chamber and the open end.

8. The housing as claimed in claim 7, wherein the masking layer is coated on the second sidewall, the connecting walls, the top wall, and is partially coated on the first sidewall of the main body, and a transparent window is defined on the first sidewall.

9. The housing as claimed in claim 8, wherein the masking layer is partially adhered to an inner wall of the transparent main body and the transparent window is exposed from the first sidewall.

10. The housing as claimed in claim 6, wherein the masking layer is made of opaque ink, paint, or metal coating.

11. A method for making a housing, comprising:
    providing an injection mold, the injection mold comprising a core defining a hole;
        a cavity matching with the core, the cavity including a positioning post;
    closing the core to the cavity to define a mold chamber;
    positioning the positioning post of the cavity in the hole of the core;
    injecting a transparent moldable plastic into the mold chamber to form a pre-finished main body, the pre-finished main body in a shape of a hollow sleeve and defining an open end, an edge formed at a peripheral of the open end;
    trimming the edge to form a transparent main body;
    forming a masking layer on the transparent main body, the masking layer forming a transparent window exposed from the masking layer; and
    providing a cover sealing the open end.

12. The method for making a housing as claimed in claim 11, wherein the core comprises a protrusion including a top portion facing the cavity, the top portion defines the hole, the positioning post is mounted on the cavity opposing the top portion.

13. The method for making a housing as claimed in claim 12, wherein the injection mold comprises at least two gates defined between the core and the cavity when the injection mold is closed.

* * * * *